US010697541B2

(12) United States Patent
Gittins et al.

(10) Patent No.: US 10,697,541 B2
(45) Date of Patent: Jun. 30, 2020

(54) TRANSMISSION PARK CONTROL SYSTEM

(71) Applicant: Ford Global Technologies, LLC, Dearborn, MI (US)

(72) Inventors: Scott Joseph Gittins, Ann Arbor, MI (US); Timothy Fedullo, Northville, MI (US); Samuel Melville Glauber, Northville, MI (US); Derek Kinch, Ypsilanti, MI (US); Joseph Scott Slayton, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 319 days.

(21) Appl. No.: 15/789,347

(22) Filed: Oct. 20, 2017

(65) Prior Publication Data
US 2019/0120378 A1  Apr. 25, 2019

(51) Int. Cl.
F16H 63/34 (2006.01)
F16K 11/07 (2006.01)
F16H 63/48 (2006.01)
F16H 61/00 (2006.01)
F16H 59/72 (2006.01)
F16H 3/66 (2006.01)

(52) U.S. Cl.
CPC ..... F16H 63/3483 (2013.01); F16H 61/0031 (2013.01); F16H 63/483 (2013.01); F16K 11/0704 (2013.01); F16H 3/66 (2013.01); F16H 59/72 (2013.01); F16H 2200/0069 (2013.01); F16H 2200/2012 (2013.01); F16H 2200/2046 (2013.01)

(58) Field of Classification Search
CPC .... F16H 63/48; F16H 63/483; F16H 63/3425; F16H 63/3483; F16H 61/0021; F16H 61/0206; F16H 59/72; F16H 2200/2012; F16H 2200/2046; F16H 2200/0069; B60T 1/005; B60T 1/062; B60W 10/115; B60W 10/182; B60W 2510/188
See application file for complete search history.

(56) References Cited

U.S. PATENT DOCUMENTS

| 2,919,603 | A  | 1/1960 | Livermore |
| 6,196,247 | B1 | 3/2001 | Knoell et al. |
| 8,439,179 | B2 | 5/2013 | Li et al. |
| 8,944,232 | B2 | 2/2015 | Schmidt et al. |
| 8,985,294 | B2 | 3/2015 | Schindler et al. |

(Continued)

FOREIGN PATENT DOCUMENTS

| DE | 102009021891 A1 | 12/2009 |
| WO | 2012062259 A1 | 5/2012 |

Primary Examiner — Richard M Lorence
(74) Attorney, Agent, or Firm — Vincent Mastrogiacomo; Brooks Kushman P.C.

(57) ABSTRACT

A park valve performs a multi-plexing function in which an out-of-park circuit is connected to line pressure when the valve is in an out-of-park position and is vented when the valve is in a park position. When particular clutches are released, the out-of-park circuit biases the park valve toward the out-of-park position. To engage park, a controller commands a low line pressure, reducing the forces that bias the park valve toward the out-of-park position. To accelerate the pressure decay in the line pressure circuit, thereby decreasing the time required to achieve park, the controller commands engagement of one or more shift elements.

14 Claims, 8 Drawing Sheets

(56) References Cited

U.S. PATENT DOCUMENTS

| | | |
|---|---|---|
| 9,027,589 B2 | 5/2015 | Coolidge |
| 9,599,214 B2 | 3/2017 | Lundberg et al. |
| 2007/0056399 A1 | 3/2007 | Barnes et al. |
| 2016/0281843 A1* | 9/2016 | Kinch ................ F16H 63/3483 |
| 2016/0341311 A1 | 11/2016 | Watanabe et al. |
| 2017/0369040 A1 | 12/2017 | Herrmann et al. |

* cited by examiner

TRANSMISSION PARK CONTROL SYSTEM

TECHNICAL FIELD

This disclosure relates to the field of hydraulic control systems for automatic transmissions for motor vehicles. More particularly, the disclosure relates to a system of engaging and disengaging a parking pawl.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

When a vehicle is parked, the transmission may engage a parking pawl which holds the transmission shaft stationary to prevent the vehicle from rolling. The parking system is designed to remain engaged without consuming any power during extended unattended periods. Normally, the parking pawl is engaged in response to the driver selecting Park and is disengaged in response to the driver selecting any other range, such as Reverse, Neutral, Drive, or Low. However, there are some conditions in which the transmission may over-ride the driver selection.

SUMMARY OF THE DISCLOSURE

A method of engaging a transmission park mechanism includes commanding a reduction in line pressure and commanding engagement of the first shift element for a predetermined duration. Commanding engagement of the first shift element increases a rate of decrease of pressure in a line pressure circuit without resulting in actual clutch engagement. When a fluid temperature is greater than a threshold, commanding engagement of the first shift element is inhibited. The method may also include commanding engagement of a second shift element for a predetermined duration, thereby further increasing the rate of decrease of pressure in the line pressure circuit. The method may further include commanding release of third and fourth shift elements.

A transmission includes a plurality of shift elements, a parking mechanism, and a controller. The controller is programmed to respond to a driver command to disengage the parking mechanism by commanding engagement of a first subset of the plurality of shift elements The controller is further programmed to respond to a driver command to engage the parking mechanism by commanding engagement of a second subset of the plurality of shift elements for a predetermined duration. The first subset and the second subset may be non-intersecting. The controller may be further programmed to command engagement of the second subset of the plurality of shift elements only when a fluid temperature is less than a threshold.

A transmission includes a park valve and a controller. The park valve has a spool mechanically linked to a park mechanism. The spool is biased toward a park position by pressure in a pump out circuit and biased toward an out-of-park position by pressure in an out-of-park circuit. The park valve fluidly connects the out-of-park circuit to a line pressure circuit when the spool is in the out-of-park position. The controller is programmed to respond to a driver command to engage the parking mechanism by commanding a reduction in pressure in the line pressure circuit and by commanding engagement of a first shift element for a predetermined duration, thereby increasing a rate of decrease of pressure the line pressure circuit. The controller may be further programmed to inhibit commanding engagement of the first shift element in response to a fluid temperature being greater than a threshold. The controller may be further programmed to respond to the driver command to engage park by also commanding engagement of a second shift element for the predetermined duration, thereby further increasing the rate of decrease of pressure in the line pressure circuit. The controller may be further programmed to respond to the driver command to engage park by also commanding release of third and fourth shift elements.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
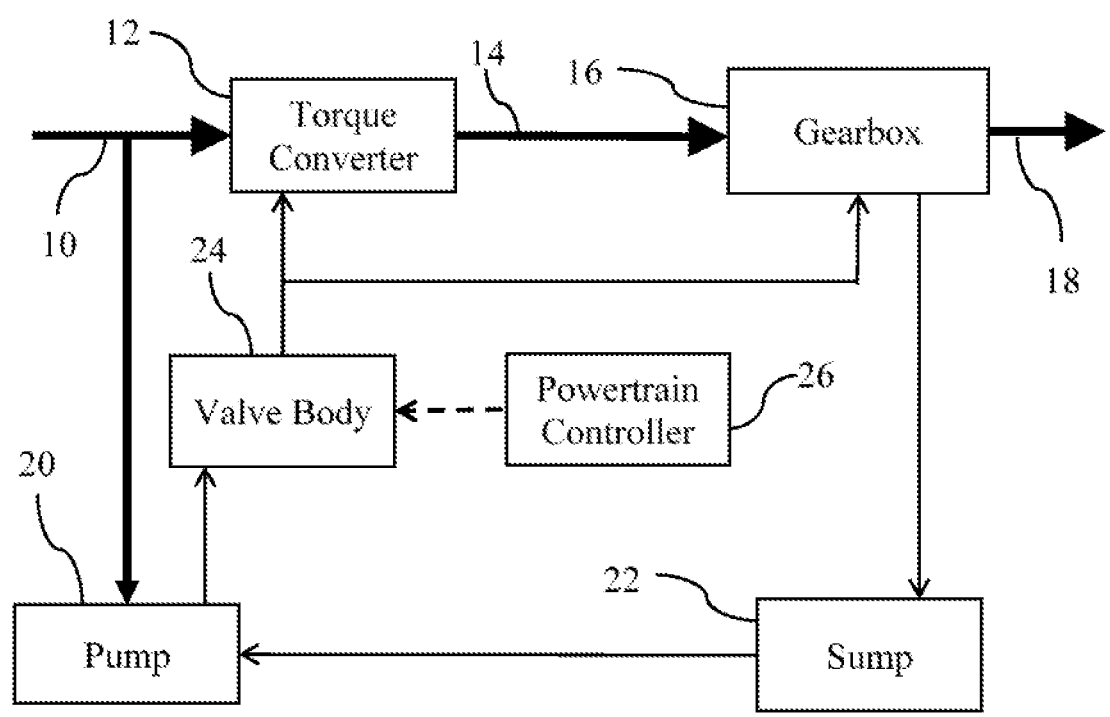
FIG. 1 is a schematic diagram of a transmission system.

FIG. 1 schematically illustrates a vehicle transmission. Bold solid lines represent mechanical power flow connections. Thin solid lines represent the flow of hydraulic fluid. Dashed lines represent the flow of information signals. Power is supplied at input shaft 10, generally from an internal combustion engine crankshaft. Fluid coupling 12 includes an impeller driveably connected to input shaft 10 and a turbine driveably connected to turbine shaft 14. Power is transmitted from the impeller to the turbine via moving fluid whenever the impeller rotates faster than the turbine. Fluid coupling 12 may be a torque converter which also includes a stator which redirects the fluid when the impeller is rotating substantially faster than the turbine such that the turbine torque is a multiple of the impeller torque. Gearbox 16 includes gearing and shift elements configured to establish various power flow paths between turbine shaft 14 and output shaft 18. Each power flow path may be established by engaging a specified subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

Most of the shift elements within gearbox 16 are engaged by supplying hydraulic fluid at an elevated pressure to a clutch apply chamber. (Gearbox 16 may also include passively engaged one-way clutches or electrically actuated elements.) Each shift element may include a clutch pack having friction plates splined to one component interleaved with separator plates splined to a different component. The fluid forces a piston to squeeze the clutch pack such that frictional force between the friction plates and the separator plates couples the components. The torque capacity of each shift element varies in proportion to changes in the fluid pressure. Pump 20, driven by input shaft 10, draws fluid from sump 22 and delivers it at an elevated pressure to valve body 24. Valve body 24 delivers the fluid to the clutch apply chambers at a pressure controlled in accordance with signals from powertrain controller 26. In addition to the fluid provided to clutch apply chambers, valve body provides fluid for lubrication and provides fluid to torque converter 12. The fluid eventually drains from gearbox 18 back to sump 22 at ambient pressure.

Figure 2:
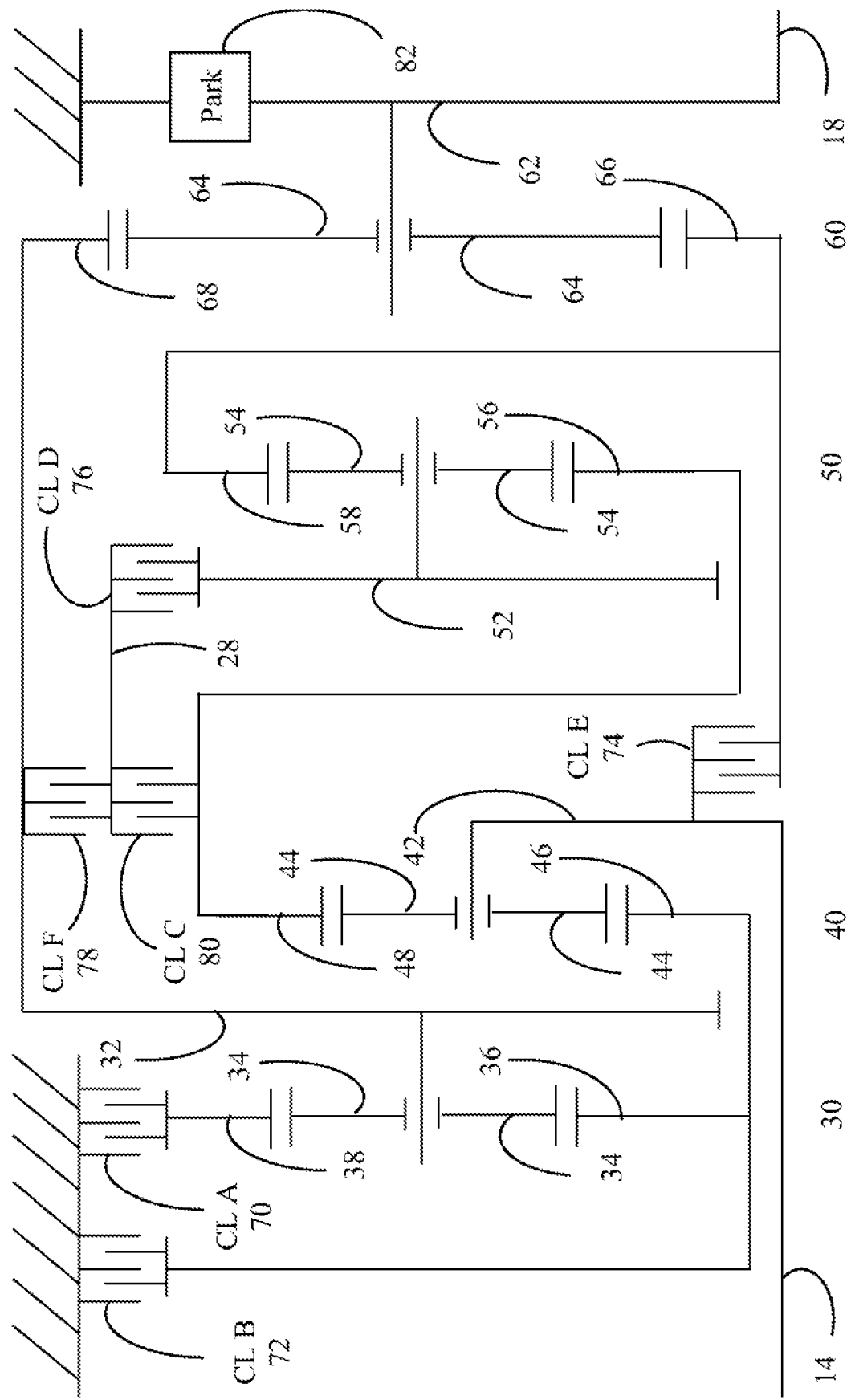
FIG. 2 is a schematic diagram of a transmission gearing arrangement suitable for the gearbox of the transmission system of FIG. 1.

An example transmission is schematically illustrated in FIG. 2. The transmission utilizes four simple planetary gear sets 30, 40, 50, and 60. Sun gear 36 is fixedly coupled to sun gear 46, carrier 32 is fixedly couple to ring gear 68, ring gear 48 is fixedly coupled to sun gear 56, ring gear 58 is fixedly coupled to sun gear 66, turbine shaft 14 is fixedly coupled to carrier 42, and output shaft 18 is fixedly coupled to carrier 62. Ring gear 38 is selectively held against rotation by brake 70 and sun gears 36 and 46 are selectively held against rotation by brake 72. Turbine shaft 14 is selectively coupled to ring gear 58 and sun gear 66 by clutch 74. Intermediate shaft 28 is selectively coupled to carrier 52 by clutch 76, selectively coupled to carrier 32 and ring gear 68 by clutch 78, and selectively coupled to ring gear 48 and sun gear 56 by clutch 80. A suggested ratio of gear teeth for each planetary gear set is listed in Table 1. The four simple planetary gear sets 30, 40, 50, and 60 may include planet gears 34, 44, 54, and 64, respectively, that mesh between associated sun gears and ring gears.

TABLE 1

| Ring 38/Sun 36 | 2.20 |
| Ring 48/Sun 46 | 1.75 |
| Ring 58/Sun 56 | 1.60 |
| Ring 68/Sun 66 | 3.70 |

As shown in Table 2, engaging the clutches and brakes in combinations of four establishes ten forward speed ratios and one reverse speed ratio between turbine shaft 14 and output shaft 18. An X indicates that the clutch is required to establish the speed ratio. An (X) indicates the clutch can be applied but is not required to establish the power flow path. In $1^{st}$ gear, either clutch 78 or clutch 80 can be applied instead of applying clutch 76 without changing the speed ratio. When the gear sets have tooth numbers as indicated in Table 1, the speed ratios have the values indicated in Table 2.

TABLE 2

|  | A 70 | B 72 | C 80 | D 76 | E 74 | F 78 | Ratio | Step |
|---|---|---|---|---|---|---|---|---|
| Rev | X | X |  | X |  | X | −4.79 | 102% |
| Park | X | X | X |  |  |  |  |  |
| $1^{st}$ | X | X |  | (X) | X |  | 4.70 |  |
| $2^{nd}$ | X | X | X | X |  |  | 2.99 | 1.57 |
| $3^{rd}$ | X |  | X | X | X |  | 2.18 | 1.37 |
| $4^{th}$ | X |  | X | X |  | X | 1.80 | 1.21 |
| $5^{th}$ | X |  | X |  | X | X | 1.54 | 1.17 |
| $6^{th}$ | X |  |  | X | X | X | 1.29 | 1.19 |
| $7^{th}$ |  |  | X | X | X | X | 1.00 | 1.29 |
| $8^{th}$ |  | X |  | X | X | X | 0.85 | 1.17 |
| $9^{th}$ |  | X | X |  | X | X | 0.69 | 1.24 |
| $10^{th}$ |  | X | X | X |  | X | 0.64 | 1.08 |

Parking pawl 82 selectively couples output shaft 18 to the transmission case to prevent vehicle movement when the vehicle is parked. Unlike shift elements 70-80, parking pawl 82 is designed to remain engaged without any external power once engaged.

Figure 3:
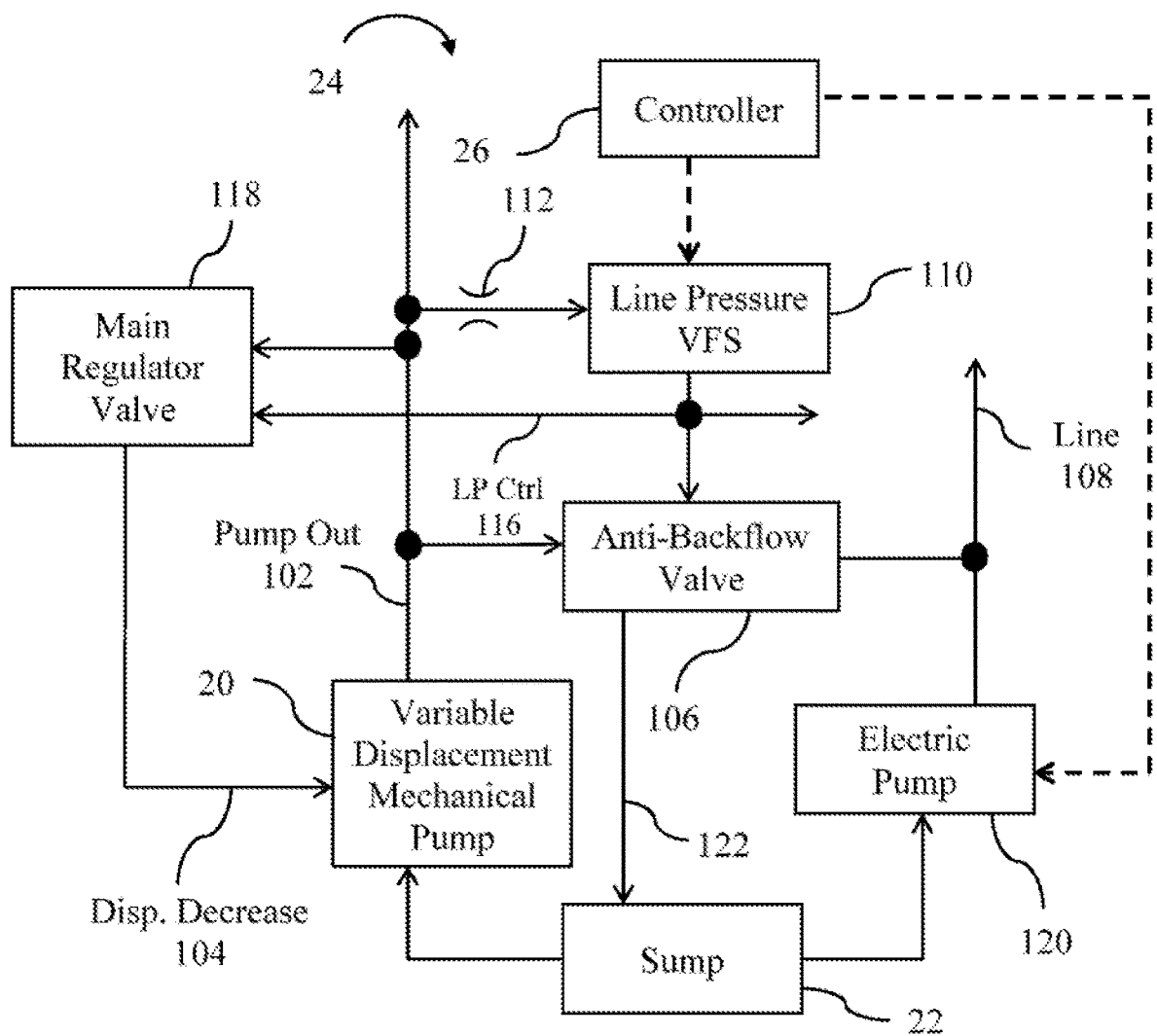
FIG. 3 is a schematic diagram of a fluid supply subsystem of a hydraulic control system for the transmission of FIG. 1.

FIG. 3 schematically illustrates a portion of valve body 24 that constitutes a fluid supply subsystem. A similar fluid supply subsystem is discussed in U.S. Patent Application Publications 2013/0014498 and 2013/0017112 which are incorporated by reference in their entirety herein. Pump 20, which is driven by the transmission input shaft, draws fluid from sump 22 and delivers the fluid to pump out circuit 102. Pump 20 is a positive displacement pump. Disregarding leakage, positive displacement pumps deliver a certain amount of fluid per revolution of the pump shaft regardless of the relative pressure at the pump inlet and pump outlet. The amount of fluid delivered per revolution is called the pump displacement. The displacement of pump 20 varies within predefined limits based on the pressure in displacement decrease circuit 104. The torque required to rotate the pump shaft increases as the pressure at the pump outlet increases relative to the pressure at the inlet and also increases in proportion to the pump displacement.

During normal operation, anti-backflow valve 106 is open such that fluid flows freely from the pump out circuit 102 to the line pressure circuit 108 and the pressure in the two circuits is substantially equal. The controller 26 adjust the pressure in these two circuits by sending a command to line pressure Variable Force Solenoid (VFS) 110. Fluid flows from the pump out circuit 102, through an orifice 112, through a valve opening in line pressure VFS 110 and then into LP Ctrl circuit 116. The pressure drop from the pump output circuit 102 to the LP Ctrl circuit 116 varies depending upon the size of the opening in line pressure VFS 110. The size of the opening in line pressure VFS 110 varies based on movement of a spool. Electrical current from controller 26 creates a magnetic force on the spool tending to enlarge the opening. Fluid in the LP Ctrl circuit 116 acts on an area of the spool to create a force tending to reduce the size of the opening. An equilibrium is reached at which the pressure in the LP Ctrl circuit 116 is proportional to the electrical current.

Main regulator valve 118 adjusts the displacement of pump 20 in order to maintain the pressure in pump out circuit 102 proportional to the pressure in the LP Ctrl circuit 116. Pressure in the LP Ctrl circuit 116 generates a force on a spool in main regulator valve 118. Pressure in the pump out circuit 102 generates a force on the spool valve in the opposite direction. When the pressure in the pump out circuit 102 exceeds the pressure in the LP Ctrl circuit 116, the spool moves to allow flow from pump out circuit 102 to displacement decrease circuit 104. Pressure in circuit 104 causes a reduction in the flow rate from pump 20 into the pump out circuit 102. Components fed by the pump out circuit 102 and the line pressure circuit 108 establish a relationship between the pressure in these circuits and the flow rate. Consequently, the reduction in flow rate results in a reduction in the pressure in pump out circuit 102 until an equilibrium is reached.

When the vehicle is stopped, such as when waiting at a traffic light, powertrain controller 26 may shut off the engine to conserve fuel. When the driver again demands torque by releasing the brake and depressing the accelerator pedal, the controller restarts the engine. In order to respond quickly after the engine is restarted, it is important to maintain some clutches in an engaged state. Fluid flow to maintain these clutches is provided by electrically driven pump 120 which directly feeds line pressure circuit 108. During engine shutdown periods, controller 26 adjusts the pressure in line pressure circuit 108 by controlling the speed of the electric motor driving pump 120. During these engine shutdown periods, controller 26 also sets the current to line pressure VFS 110 to an intermediate level causing the pressure in LP Ctrl circuit 116 to be at an intermediate level. In response to this reduction in LP Ctrl pressure, the spool of anti-backflow valve 106 moves to a position in which the line pressure circuit is isolated from the pump out circuit 102, reducing the number of components that must be fed by the electric pump 120. In circumstances which will be described below, controller 26 may set the current to line pressure VFS 110 to a low level which moves the spool of the anti-backflow valve 106 to a position in which the line pressure circuit 108 is isolated from the pump out circuit 102 and fluidly connected to vent circuit 122. In this condition, the pressure in line pressure circuit 108 drops rapidly to ambient pressure.

Figure 4:
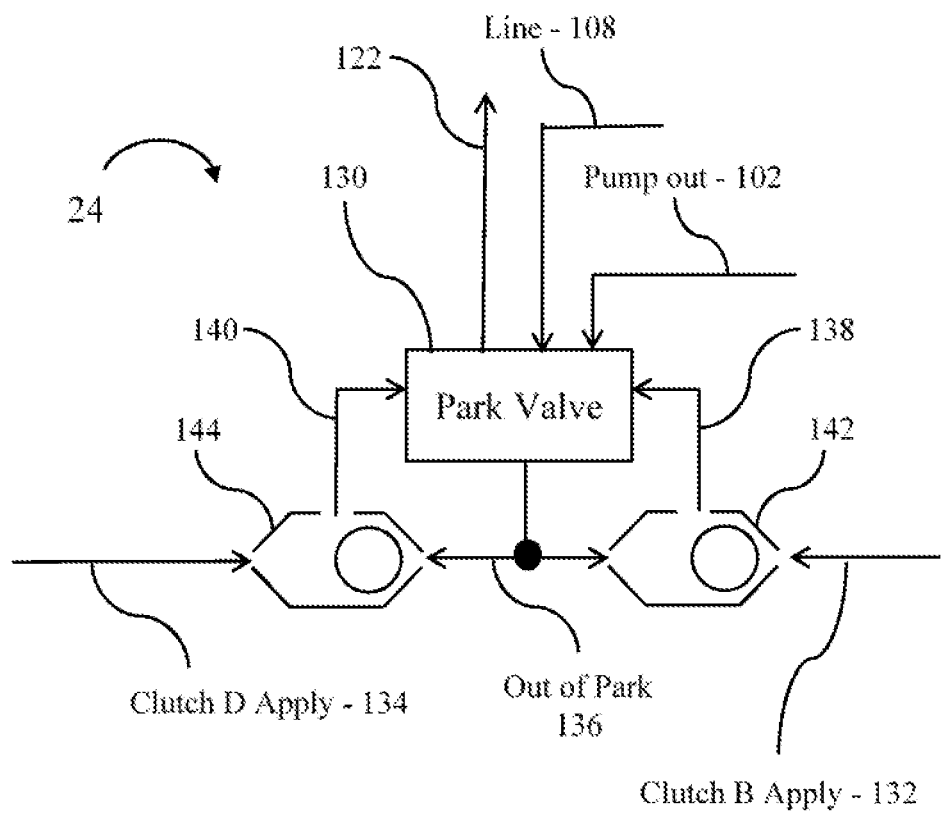
FIG. 4 is a schematic diagram of a park subsystem of a hydraulic control system for the transmission of FIG. 1.

FIG. 4 schematically illustrates the park control subsystem of valve body 24. A spool of park valve 130 is mechanically linked to the park mechanism 82, such that movement of the spool in one direction engages the park mechanism and movement in the opposite direction disengages the park mechanism. The structure of park valve 130 is described in more detail below. A spring within the park mechanism biases the system toward engagement. Also, pressure in the pump out circuit 102 acts on an area of the spool to bias the system toward park engagement. The hydraulic control system also includes a set of clutch apply circuits that are routed to the apply chambers of each of the hydraulically controlled shift elements. The pressures of fluid in the clutch apply circuits are controlled to levels between zero and the pressure in the pump out circuit 102 or the line pressure circuit 108. These clutch apply circuits include circuits 132 and 134 that engage shift elements B and D respectively. Park valve 130 fluidly connects an out-of-park circuit 136 to the line pressure circuit 108 when park is disengaged and vents out-of-park circuit 136 when park is engaged. Hydraulic circuits 138 and 140 bias the park valve toward the disengaged position. Check valve 142 fluidly connects circuit 138 to either clutch B apply circuit 132 or out-of-park circuit 136, whichever has the higher pressure. Similarly, check valve 144 fluidly connects circuit 140 to either clutch D apply circuit 134 or out-of-park circuit 136, whichever has the higher pressure.

When the park mechanism is engaged, both the park mechanism itself and pressure in pump out circuit 102 tend to hold park valve 130 in the engaged position. To disengage the park mechanism, clutches B and D are engaged by commanding full pressure to apply circuits 132 and 134. Check valves 142 and 144 fluidly connect these clutch apply circuits to circuits 138 and 140 respectively. Pressure in circuits 138 and 140 force the park valve into the disengaged position. Once in the disengaged position, park valve 130 fluidly connects out-of-park circuit 136 to line pressure circuit 108. As a result, the park valve tends to stay in the disengaged position even if clutches B and D are later released. To re-engage the park mechanism, the pressure in pump out circuit 102 is reduced to a level at which the park mechanism spring forces the park valve to the engaged position. For faster engagement of park, the line pressure may be vented via anti-backflow valve 106 as described above. With the engine running, pump out circuit 102 will have pressure forcing the spool toward the engaged position.

Figure 5:
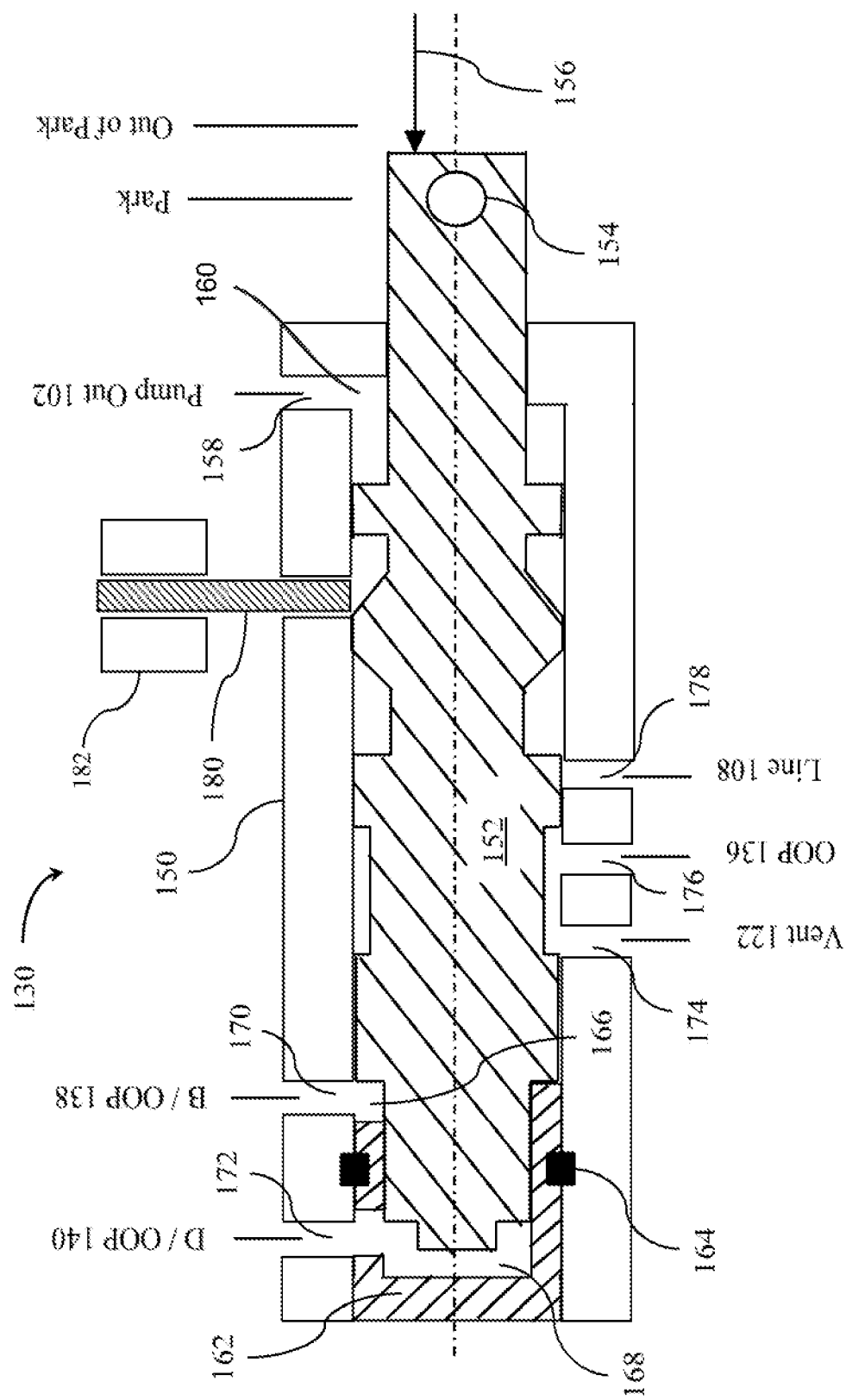
FIG. 5 is a cross section of a park valve assembly of the park subsystem of FIG. 4 in a position corresponding to park engaged.

FIG. 5 shows a cross section of park valve 130 in the position corresponding to Park. The valve includes a housing 150 with a bore and several ports. Spool 152 slides within the bore. Spool 152 is mechanically linked to the park mechanism via a feature such as hole 154. The park mechanism includes a spring that applies a return force 156 on spool 152 tending to push it to the left (pawl engaged position). Pump out circuit 102 is connected to port 158 to provide fluid to chamber 160. Pressure in chamber 160 biases spool 152 toward the left, tending to hold the park mechanism in the engaged position.

End cap 162 is held in position relative to housing 150 by retaining clip 164. End cap 162, housing 150, and spool 152 cooperate to define chambers 166 and 168. Circuits 138 and 140 are connected to ports 170 and 172 respectively to provide fluid to chambers 166 and 168 respectively. Fluid pressure in these chambers act on separate areas of spool 152, biasing spool 152 toward the right. Ports 174, 176, and 178 are connected to vent 122, out-of-park circuit 136, and line pressure circuit 108 respectively. When spool 152 is in the position shown in FIG. 5, it fluidly connects ports 174 and 176 to such that the pressure in out-of-park circuit 136 is approximately equal to ambient pressure.

Holding pin 180 is shown in a retracted position in which it does not engage spool 152. Pin 180 may be biased toward this position by a spring or other force. When current is supplied to solenoid 182, it applies a magnetic force to pin 180 pushing it into engagement with spool 152.

Figure 6:
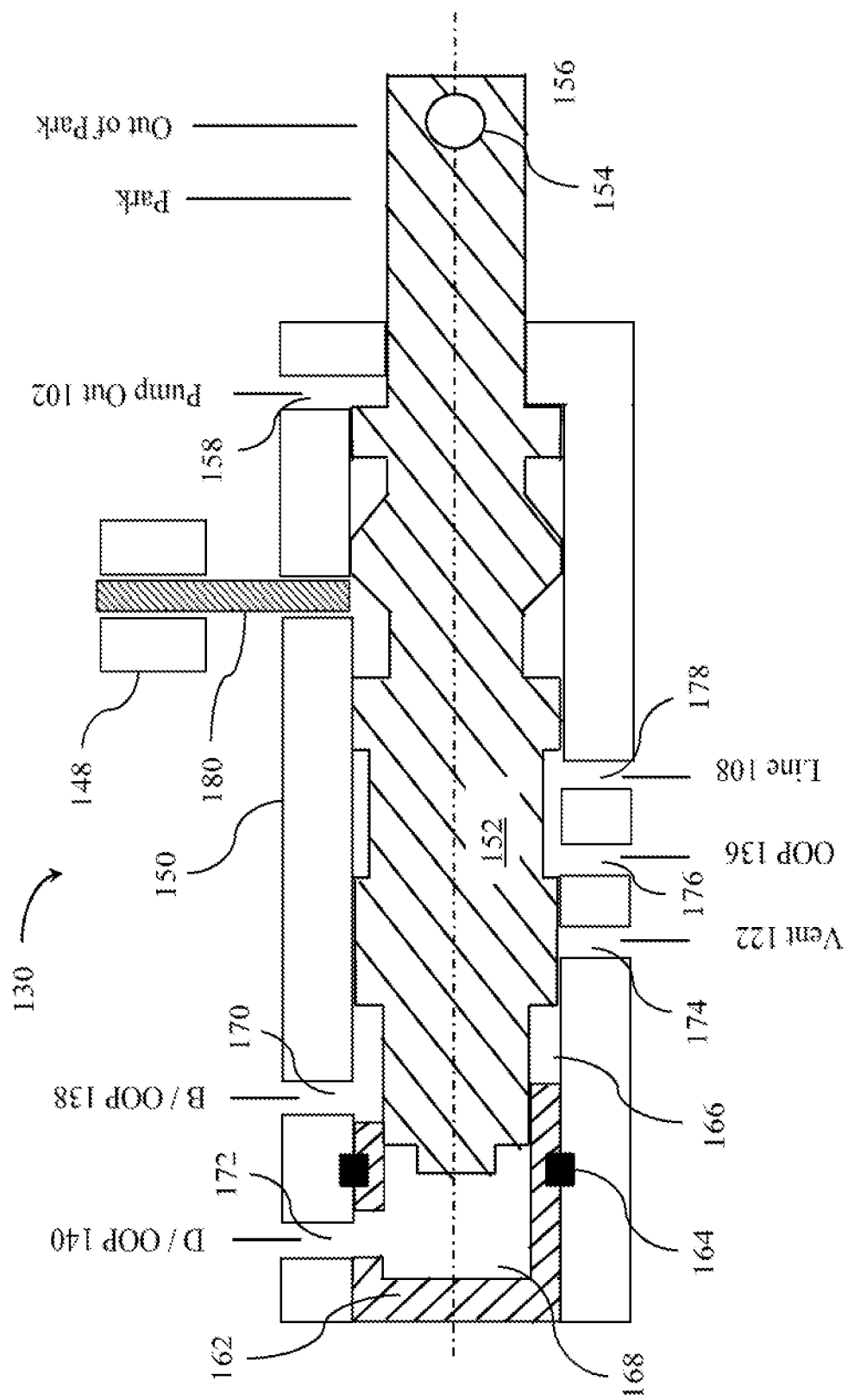
FIG. 6 is a cross section of a park valve assembly of the park subsystem of FIG. 4 in a position corresponding to park dis-engaged.

FIG. 6 shows a cross section of park valve 130 in the position corresponding to Drive, Reverse, or Neutral. The valve is moved from the position of FIG. 5 to the position of FIG. 6 by engaging shift elements B and D. The clutch apply pressure of these shift elements act on a larger area on the left side of spool 152 than what pump out pressure acts on the right side of spool 152, causing a net rightward force. When the line pressure is sufficiently high, this net force overcomes the force of the park mechanism return spring, pushing spool 152 to the position shown in FIG. 6 and disengaging the parking pawl. Note that during the transition from the position of FIG. 5 to the position of FIG. 6, the volumes of chambers 166 and 168 both increase.

With spool 152 in this position, port 176 is fluidly connected to port 178 such that line pressure circuit 108 is fluidly connected to out-of-park circuit 136. Due to the behavior of check valves 142 and 144, line pressure will continue to be supplied to ports 170 and 172 even if shift elements B and D are later released.

To re-engage park, line pressure is reduced while shift elements B and D are dis-engaged. During the initial phase of movement, the pressure in chambers 166 and 168 is equal to line pressure because they are fluidly connected to the line pressure circuit via the out of park circuit 136. If the pump out circuit 102 is fluidly connected to the line pressure circuit 108 via the anti-drainback valve, then the net hydraulic pressure is small and the force to move the spool is provided by park mechanism return spring force 156. If the line pressure circuit is vented via the anti-drainback valve, then pressure in pump out circuit 102 acts to move the spool toward the left.

Figure 7:
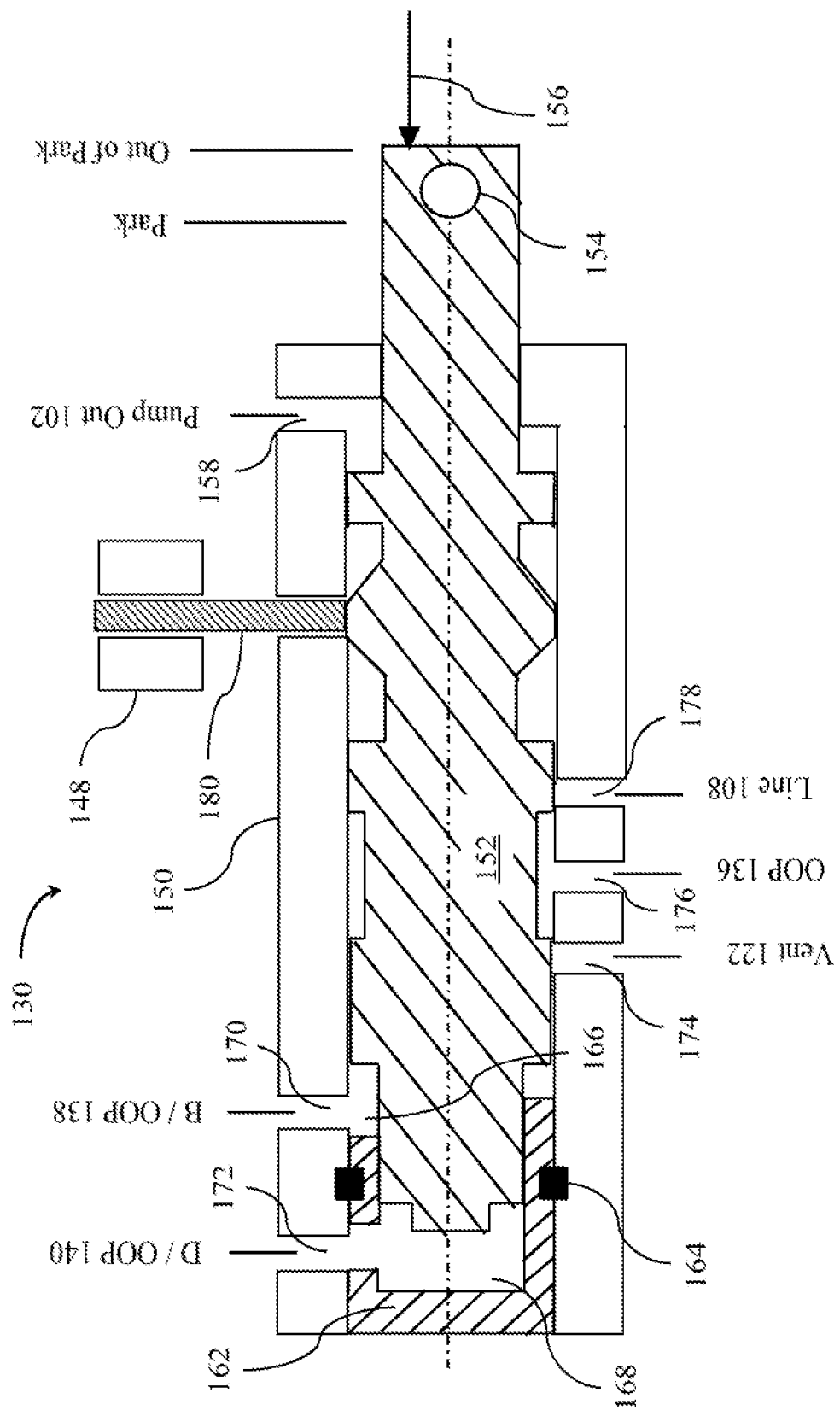
FIG. 7 is a cross section of a park valve assembly of the park subsystem of FIG. 4 in an intermediate position between park engaged and park dis-engaged.

As spool 152 moves toward the engaged position of FIG. 5, it must pass through the position illustrated in FIG. 7. In this position, port 176 is not fluidly connected to either port 174 or port 178. Thus, out of park circuit 136 is not fluidly connected to either vent 122 or to line pressure circuit 108. Notice that for spool 152 to continue moving leftward, the volume of chambers 166 and 168 must continue to decrease. However, since these chambers are connected to out of park circuit 136, there is no path for this fluid to escape. When the fluid is at normal operating temperature, the viscosity is low enough that leakage between the spool and the housing is sufficient to provide an adequate escape path. However, when the fluid is cold, the time required for the spool to move the rest of the way to the position of FIG. 5 may be excessive.

When the hydraulic fluid is cold, the delay in moving spool 152 may be exacerbated by other delays in the hydraulic system. For example, the spool of anti-backflow valve 106 may also be slow to move. The spool of the anti-backflow valve must move some distance before the line pressure circuit 108 and the pump out circuit 102 are isolated from one another. From that point, it must move even further before the line pressure circuit is vented. During this interval, pressure in the line pressure circuit decays slowly because the flow resistance to fluid leaving the circuit is high. Until the pressure in the line pressure circuit decays substantially, there is little net force pushing spool 152 leftward.

Figure 8:
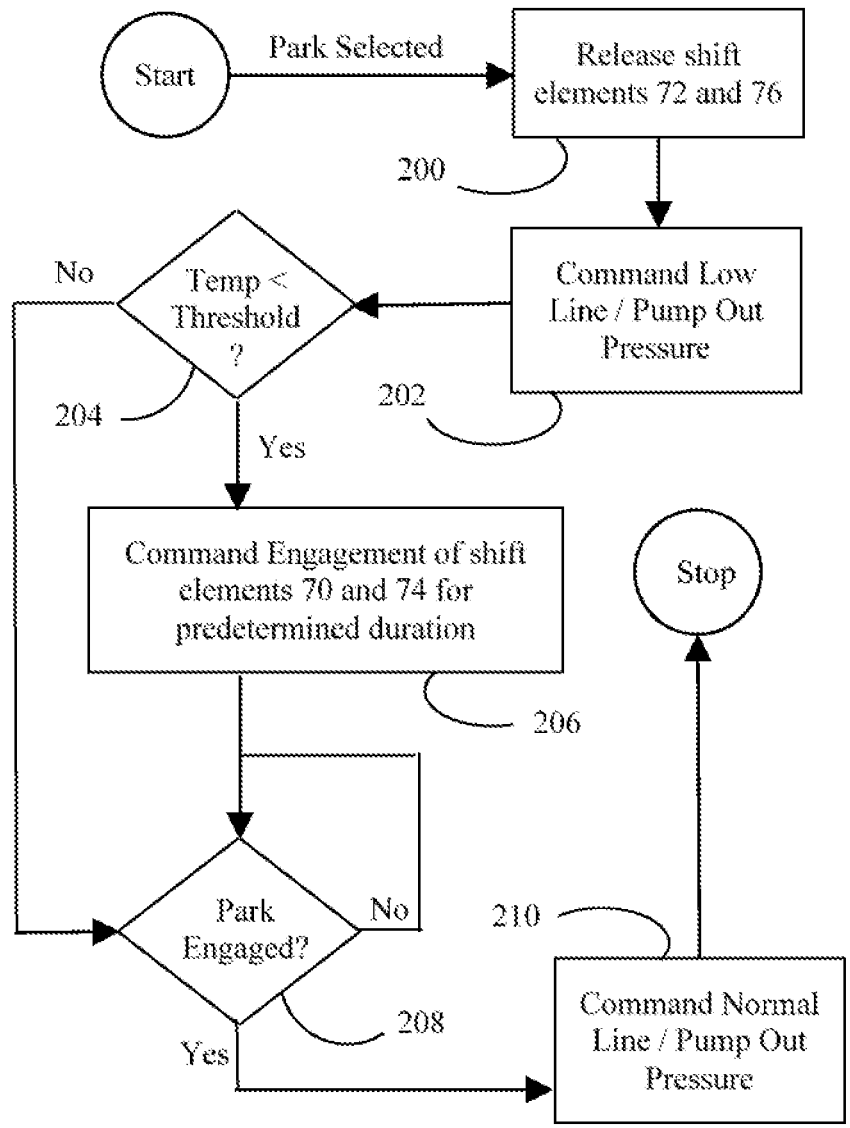
FIG. 8 is a flow chart illustrating a method of operating the transmission system of FIG. 1 during engagement of Park.

FIG. 8 illustrates a procedure which reduces the time required to move spool 152 when the fluid is cold by increasing the decay rate of line pressure. The process is initiated in response to the driver selecting park. At 200, the controller commands release of shift elements 72 and 76 if they are not already released. At 202, the controller commands the line pressure to a low value. As discussed above, this also reduces the pressure in the pump out circuit 102. At 204, the controller determines whether the fluid temperature is less than a threshold temperature. If so, the controller briefly commands engagement of shift elements 70 and 74. Commanding engagement of these shift elements fluidly connects line pressure circuit 108 to the respective apply chambers. This provides an escape route for the fluid in the line pressure circuit, increasing the rate of decay of pressure. Because the engagement command is only maintained for a short time, and the line pressure is relatively low during that time, the shift elements are never actually engaged. If the fluid temperature is above the threshold at 204, step 206 is skipped as unnecessary. The controller waits at 208 until the parking pawl is engaged. Then, the controller resumes normal line pressure scheduling at 210.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of engaging a transmission park mechanism comprising:
   in response to a driver command to engage park while a first shift element is engaged, commanding release of the first shift element and commanding a reduction in line pressure of a line pressure circuit; and
   in response to an oil temperature being less than a threshold, commanding engagement of a second shift element for a predetermined duration before commanding release of the second shift element thereby increasing a rate of decrease of pressure in the line pressure circuit.

2. The method of claim 1 further comprising:
   in response to the oil temperature being less than the threshold and the driver command to engage park, commanding engagement of a third shift element for the predetermined duration before commanding release of the third shift element thereby further increasing the rate of decrease of pressure in the line pressure circuit.

3. The method of claim 2 further comprising:
   in response to the driver command to engage park occurring while a fourth shift element is engaged, commanding release of the fourth shift element.

4. The method of claim 1 further comprising:
   in response to the driver command to engage park occurring while a third shift element is engaged, commanding release of the third shift element.

5. The transmission of claim 1 wherein predetermined duration is insufficient to engage the second shift element.

6. A transmission comprising:
a plurality of shift elements including first and second non-intersecting subsets of the shift elements;
a parking mechanism; and
a controller programmed to
respond to a driver command to disengage the parking mechanism by commanding engagement of the first subset of the plurality of shift elements, and
respond to a driver command to engage the parking mechanism by commanding engagement of the second subset of the plurality of shift elements for a b predetermined duration
only when a fluid temperature is less than a threshold.

7. The transmission of claim 6 wherein predetermined duration is insufficient to engage the second subset.

8. A transmission comprising:
a park valve having a spool mechanically linked to a park mechanism, the spool biased toward a park position by pressure in a pump out circuit and biased toward an out-of-park position by pressure in an out-of-park circuit, wherein the park valve fluidly connects the out-of-park circuit to a line pressure circuit when the spool is in the out-of-park position; and
a controller programmed to respond to a driver command to engage the parking mechanism by commanding a reduction in pressure in the line pressure circuit and by commanding engagement of a first shift element for a predetermined duration, in response to a fluid temperature being less than a threshold, thereby increasing a rate of decrease of pressure in the line pressure circuit.

9. The transmission of claim 8 wherein the controller is further programmed to inhibit commanding engagement of the first shift element in response to the fluid temperature being greater than the threshold.

10. The transmission of claim 8 wherein the controller is further programmed to respond to the driver command to engage park by also commanding engagement of a second shift element for the predetermined duration, in response to a fluid temperature being less than a threshold, thereby further increasing the rate of decrease of pressure in the line pressure circuit.

11. The transmission of claim 10 wherein the controller is further programmed to respond to the driver command to engage park by also commanding release of third and fourth shift elements.

12. The transmission of claim 10 wherein the controller is further programmed to inhibit commanding engagement of the second shift element in response to the fluid temperature being greater than the threshold.

13. The transmission of claim 8 wherein the controller is further programmed to respond to the driver command to engage park by also commanding release of second and third shift elements.

14. The transmission of claim 8 wherein predetermined duration is insufficient to engage the first shift element.

* * * * *